US006327278B1

(12) United States Patent
Toscheck et al.

(10) Patent No.: US 6,327,278 B1
(45) Date of Patent: Dec. 4, 2001

(54) DIODE LASER PUMPED MULTIMODE WAVEGUIDE LASER, PARTICULARLY FIBER LASER

(76) Inventors: Peter E. Toscheck, Kostersteig 9, 20149 Hamburg; Rainer Boehm, Hastedtstrasse 1, 21614 Buxtehude; Valerie M. Baev, Hasenwinkel 50, 22559 Hamburg, all of (DE)

( * ) Notice: Subject to any disclaimer, the term of this patent is extended or adjusted under 35 U.S.C. 154(b) by 0 days.

(21) Appl. No.: 09/254,411

(22) PCT Filed: Sep. 8, 1997

(86) PCT No.: PCT/EP97/04890

§ 371 Date: Jun. 10, 1999

§ 102(e) Date: Jun. 10, 1999

(87) PCT Pub. No.: WO98/10496

PCT Pub. Date: Mar. 12, 1998

(30) Foreign Application Priority Data

Sep. 6, 1996 (DE) ............................................. 196 36 236

(51) Int. Cl.[7] .................................................... H01S 3/30
(52) U.S. Cl. .............................................................. 372/6
(58) Field of Search ..................................................... 372/6

(56) References Cited

U.S. PATENT DOCUMENTS

| 3,599,106 | * | 8/1971 | Snitzer | 330/4.3 |
| 3,774,121 | * | 11/1973 | Ashkin | 331/94.5 |
| 3,827,785 | * | 8/1974 | Matsushita | 350/175 |
| 3,876,308 | * | 4/1975 | Alpers | 356/152 |
| 3,881,802 | * | 5/1975 | Helava | 350/6 |
| 3,927,385 | * | 12/1975 | Pratt | 331/94.5 |
| 4,544,229 | * | 10/1985 | Verber | 350/96.14 |
| 4,879,723 | * | 11/1989 | Dixon | 372/21 |
| 5,084,880 |   | 1/1992 | Esterowitz et al. . | |
| 5,182,759 | * | 1/1993 | Anthon | 372/72 |
| 5,311,525 |   | 5/1994 | Pantell et al. . | |
| 5,426,656 |   | 6/1995 | Tohmon et al. . | |
| 5,430,824 |   | 7/1995 | Chigusa et al. . | |
| 5,909,306 | * | 6/1999 | Goldberg | 359/341 |
| 6,058,128 | * | 5/2000 | Ventrudo | 372/96 |
| 6,129,723 | * | 10/2000 | Anderson | 606/13 |

FOREIGN PATENT DOCUMENTS

| 37 18908 C1 | 5/1987 | (DE) . |
| 2 020 013 A | 7/1979 | (GB) . |
| 92/20125 | 12/1992 | (WO) . |

OTHER PUBLICATIONS

Bohm et al., "Intracavity Absorption Spectroscopy with a Nd3+—Doped Fiber Laser," Optics Letter 18(22):1955–1957 (1993).

Millar et al., "Low–Threshold CW Operation of an Erbium–Doped Fibre Laser Pumped at 807 nm Wavelength," Electronic Letters, 23(16):865–866 (1987).

Jansen, Otische Ubertragungstechnik mit Lichtwellenleitern, Fiedr.Vieweg & Sohn Verlagsgesellschaft MBH, Braunschweig/Wiesbaden, Germany, pp. 173–174 (1993).

* cited by examiner

Primary Examiner—Teresa M. Arroyo
Assistant Examiner—Gioacchino Inzirillo
(74) Attorney, Agent, or Firm—Shumaker & Sieffert, P.A.

(57) ABSTRACT

The invention concerns a multimode waveguide laser (1, 2, 3, 5) which is characterized by the fact that the waveguide's cutoff wavelength is smaller than the smallest wavelength of the emission spectrum of the waveguide laser. Advantageously, the waveguide laser and te diode laser (6) in the wavelength range of the waveguide laser emission are optically decoupled, thus making the diode laser pumped waveguide laser specially suitable for intra-cavity spectroscopy.

27 Claims, 6 Drawing Sheets

DIODE LASER PUMPED MULTIMODE WAVEGUIDE LASER, PARTICULARLY FIBER LASER

The invention refers to a diode laser pumped multimode waveguide laser, particularly a fiber laser.

BACKGROUND

Multimode lasers are employed in various spectroscopic applications, among others. Absorption spectroscopy requires a broad-band emitting light source, when narrow absorption lines are to be studied within the emission spectrum. In the field of highly sensitive spectroscopy, the method of intra-cavity spectroscopy has taken a wide application range in research activities. This purpose requires multimode lasers, the resonators thereof being equipped with a light amplifying medium and, in addition, an absorption cell with a narrow-band absorber.

In recent years, a great number of lasers suited for this type of spectroscopy have been developed. Mostly, these are dye lasers or solid state lasers pumped by an ion laser. Such arrangements may have a smooth emission spectrum since they emit in a plurality of independent laser modes at the same time, yet they are restricted to lab use, because dye lasers are very sensitive to external influences and ion lasers that are the pump source are difficult to transport, have a high energy consumption and must be connected to a cooling water line with a high flow rate. Further, most of the absorbers relevant for practical use have a well measurable absorption in the infrared range, whereas conventional multimode lasers mostly operate best in the visible spectral range.

In this respect, waveguide lasers, and in particular fiber lasers, promise substantial improvements since they are suited for compact designs, are mechanically stable enough and practically insensitive to external influences, and do not require complicated cooling. Moreover, the waveguide may readily be doped with different active ions, whereby the range of emission may be predetermined well and may be set to lie within the infrared range.

However, presently used waveguide lasers are disadvantageous in that they must be pumped by an ion laser. The application of a fiber laser, pumped by an argon ion laser, in intra cavity spectroscopy is known, for example, from a publication in OPTICS LETTERS 1993, vol. 18, No. 22, p. 1955, entitled "Intracavity absorption spectroscopy with a $Nd^{3+}$-doped fiber laser". Yet, this arrangement is not suited for mobile use, due to the argon ion laser.

It is further known from the same publication that fiber lasers can be pumped by diode lasers. However, the emission spectra obtained thereby are, as of yet, not suited for absorption spectroscopy with a narrow-band absorber since they show substantial irregularities that make the resolution of the absorption lines impossible.

SUMMARY

It is the object of the present invention to develop a diode laser pumped wave guide laser such that it is suited for this kind of absorption spectroscopy. Compared to the conventional arrangements, the laser and its pump source should be simple and economical to produce, have dimensions that allow for an easy transport and should not be too demanding with a view to its energy supply.

According to the present invention, the object is solved with a diode laser pumped multimode wave guide laser, characterized in that the cutoff wavelength of the waveguide is smaller than the smallest wavelength of the emission spectrum of the wave guide laser.

Each laser mode in the wave guide laser has longitudinal and transverse components. Above the so-called cutoff wavelength, which is also referred to as the limit wavelength and is specific to the waveguide, only the longitudinal components and the transverse fundamental components of the waveguide are transmitted.

It has ben found that in waveguide lasers different transverse components of the modes interfere with each other, thereby causing spectral noises. However, since all laser modes have the same transverse components, namely the fundamental components, above the cutoff wavelength, no noises occur and the emission spectrum is not superimposed by sharp interference structures that cover narrow absorption lines. Further, it is very sensitive to narrow-band absorption in the resonator, since the absorption suppresses only individual modes, taking no influence on the other modes. Preferably, the cutoff wavelength should be at least 20 nm below the smallest emission wavelength.

Preferably, the light amplifiers used are waveguides doted with ions from the group of rare earths, in particular Nd, Yb, Tm, Ho, Er or Pr.

Such a diode laser pumped wave guide laser becomes particularly handy if the waveguide is a fiber, for example a glass fiber. Depending on the doping, the fiber may be selected with an appropriate length and wound on a hub. Thus, one can construct a particularly small and handy laser.

Preferably, a so-called stepped index fiber is employed, where the fiber core and the fiber sheath have different refractive indices $n_{core}$ or $n_{sheath}$ with distinct limits. With such fibers, the cutoff wavelength $\lambda_{cut}$ is calculated, for example, as follows:

$$\lambda_{cut} = 2\pi a \, NA/2.405.$$

Here, a is the radius of the fiber core;

NA is the numeric aperture, obtained from $$NA = (n_{core}^2 - n_{sheath}^2)^{1/2}.$$

So-called indiffused waveguides may also be used as the waveguides.

For the purposes of the highly sensitive intra-cavity spectroscopy, one end of the waveguide is reflective and the other end is non-reflective. The end of the resonator on the non-reflective side of the waveguide is formed by another external mirror. The beam path within the resonator extends unobstructed outside the waveguide between the non-reflective end of the waveguide and the external mirror. This space may be used for absorption spectroscopy at a narrow-band absorber. To this end, one either introduces an absorption cell into the resonator, or the absorber to be analyzed is inserted directly into the open resonator.

Preferably, the non-reflective end of the waveguide is also cut or broken in a beveled manner if no perfect non-reflective coating can be obtained. Thus, multiple reflections at the limit surface lying in the laser resonator are avoided, which could otherwise cause the spectrum to be superimposed by an interfering structure again. Preferably, the angle between the normal to the surface of the non-reflective end and the axis of the waveguide should be between 1° and 15°. The end may also be cut under the Brewster angle that depends on the waveguide material.

Further, it has been found that disturbing superimposed structures on the emission spectrum may be suppressed by optically decoupling the waveguide laser and the diode laser in the wavelength range of the emission. Some laser light always escapes not only through the outcoupling mirror of the waveguide, but also through the coupling mirror. In particular, if the waveguide laser is pumped collinearly by the diode laser, this laser beam can be reflected in the pumping diode or the collimating optics of the pumping diode and be returned into the waveguide laser. The occurring wavelength selection of the radiation fed back into the waveguide laser is superimposed on the emission spectrum in an interfering manner.

An optical decoupling may be obtained, for example, through a particularly high degree of mirroring on the reflective waveguide end for the emission wavelength, having a reflectivity of at least 98%, preferably more than 99%. At the same time, the reflectivity regarding the pumping wavelength should be as low as possible so as to guarantee a low pumping threshold energy of the diode laser.

According to another embodiment, an optical diode is provided between the laser diode and the waveguide laser. The optical diode is non-transmissive for the reflected light at the emission wavelengths of the waveguide laser. Laser light decoupled at the reflective end of the waveguide falls through the optical diode onto the collimating optics and the pumping diode, but is not reflected back into the waveguide laser by the optical diode.

In another embodiment, the optical decoupling is achieved by the collimating optics having a chromatic aberration between the pumping diode and the waveguide laser. The pumping light of the laser diode is focused onto the end face of the waveguide, the laser emission from the waveguide laser, however, is focused by the collimating optics onto a larger area due to the different wavelength thereof. Therefore, there is only very much reduced reflection back into the waveguide.

With a laser having an external resonator mirror, the wavelength range of the emission may be determined not only by the doping of the waveguide, the maximum of reflection of the mirrors, the pumping wavelength or a grid structure in the waveguide, but also by a wavelength-selective element disposed outside the waveguide within the resonator. The wavelength-selective element may either be fixed or movable. Thereby, the emission wavelength of the waveguide is either set fixed or it may be adjusted during operation. In the first case, the laser may be made particularly robust and economically, but it can only be used with a certain group of absorbers, whereas, in the latter case, the laser has a wide tuning range and, thus, may be adapted to several absorbers, while having a more complicated design and being more expensive.

A wavelength-selective element with optical dispersion has been found particularly useful. Preferably, a conventional lens with chromatic aberration or a gradient lens with chromatic aberration is used for this purpose. The wavelength-selective element is arranged movably between the waveguide and the external resonator mirror. The selection of the emission wavelength is effected by displacement, for example, mechanical or piezo-electric displacement. This embodiment is advantageous, since one component for collimating the beam leaving the waveguide in a divergent manner must be provided anyway. Therefore, no further element is required in the resonator for wavelength selection, which element could cause new problems of multiple reflection or light losses.

If no tuning ability of the waveguide laser is required, that is, the emission range is to be set only once by the wavelength-selective element, the lens need not be arranged movably. In this case, a gradient lens may be integrally connected to the waveguide, whereby the number of limit surfaces within the resonator will be reduced.

Another possible way of wavelength selection is to employ a wavelength-selective element of electro-optical material with optical dispersion, e.g., an electro-optical crystal. The index of refraction of such an element may be altered electrically. The wavelength selection and the tuning of the laser are done purely electrically. No mechanical parts are required in the resonator that could predetermine the mechanical stress limits of the design. The electro-optical crystal may also be integrally connected to the waveguide, with the tuning ability being maintained nevertheless.

It is an advantage of tuning elements with optical dispersion that they are mildly selective. In contrast to other elements such as grids, for example, a broad emission is maintained.

Tuning the laser may also be effected through known mirror and/or prism arrangements. In particular, the divergent beam emitted from the waveguide may be collimated using a parabolic mirror and deflected onto a prism. To avoid unnecessary limit surfaces within the resonator, the prism may be reflective on one face. Thus, it simultaneously serves as a resonator mirror.

In another embodiment, the wavelength-selective element used is a resonator mirror with a variable maximum of reflection. With such mirrors, the wavelength of the maximum of reflection varies across the surface. This property is found, for example, in so-called graded mirrors. By displacing the mirror at right angles to the beam path, the wavelength of the maximum of reflection, and thereby the emission range of the laser, is changed.

It is obvious to the expert that the above explained possibilities of decoupling and wavelength selection can be used in all possible combinations. One may also implement several decoupling and wavelength selection possibilities at the same time.

The embodiments of the present waveguide laser with an external resonator mirror have their application in particular in the field of intra-cavity spectroscopy.

Preferably, the duration of the pumping pulses of the diode laser is variable in all the above-mentioned embodiments. Thus, in intra-cavity spectroscopy, the dynamic range of absorption measurement is selectable.

DETAILED DESCRIPTION

Figure 1:
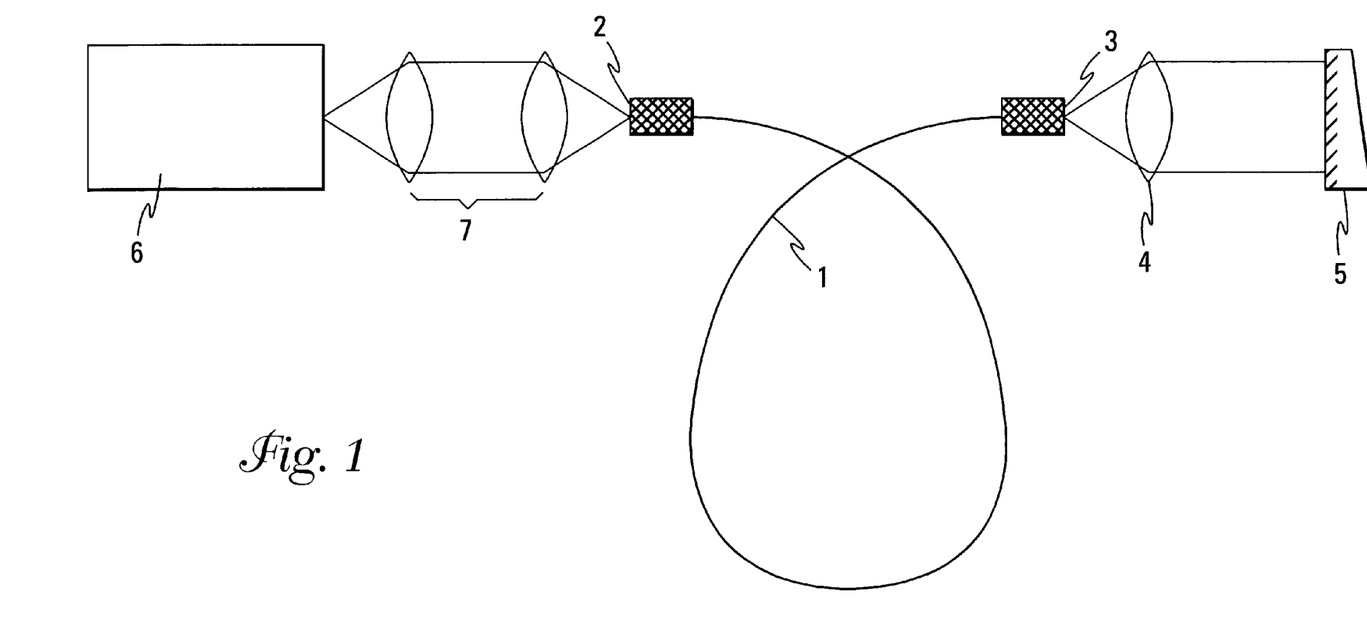
FIG. 1 illustrates a diode laser pumped fiber laser with an external resonator and a lens with an achromatic aberration as a wavelength-selective element.

The laser illustrated in FIG. 1 is a fiber laser. The glass fiber 1, doped with $Nd^{3+}$ ions in a concentration of 500 ppm, has a highly reflective mirroring on one end 2. The mirroring is vapor coated directly onto the end face of the fiber. The reflectivity for wavelengths between 900 and 1150 nm is 99.8%, but less than 10% for wavelengths between 815 and 825 nm. The other end 3 of the glass fiber 1 is coated for wavelengths between 900 and 1150 nm and is cut obliquely to the fiber axis. The angle between the normal to the surface of the cut and the fiber axis is 6°. Together with the other mirror 5, the reflective fiber end 2 forms an optical resonator. The outer resonator portion is coupled to the fiber 1 through the lens 4. The lens 4 collimates the divergent light coming from the fiber 1 under an angle of divergence of about 10°. The cutoff wavelength of the selected fiber is 860 nm. The fiber has a length of 20 cm. The external mirror 5 is spaced about 30 cm from the non-reflective end of the fiber.

The fiber laser is pumped optically by a diode laser 6 with a wavelength of about 815 to 825 nm. The beam from the diode laser 6 is collinearly coupled into the fiber by collimating optics 7, causing therein the inversion necessary for the laser operation.

Since the cutoff wavelength is smaller than the smallest emission wavelength, only the longitudinal component and the transverse fundamental components of each laser mode start to oscillate. Consequently, the transverse components of the modes are identical and do not interfere with each other. Thus, the spectrum is not irregularly modulated by interference structures.

Moreover, when collinearly coupling the diode laser into the fiber laser, undesirable interaction between the two lasers can occur. Laser light not only leaves the resonator through the outcoupling mirror 5, but also through the mirror 2. This light passes through the collimating optics 7 into the resonator of the laser diode 6 and is reflected several times between the limit surfaces and the resonator mirrors of the diode. Due to interferences, only particular wavelengths are reflected back into the fiber laser, whereas other wavelengths are suppressed. To suppress this effect, which also causes a modulation of the emission spectrum of the fiber laser, the fiber laser and the laser diode are optically decoupled with respect to the emission wavelength of the fiber laser. This is achieved by a highly-reflective coating of the fiber end 2, whereby only very little light is emitted from the fiber laser towards the diode laser 6 or the little light reflected from the diode laser 6 and the collimating optics 7 is no longer transmitted into the fiber 1.

The wavelength range of the fiber laser, in which the emission lies, is determined by the lens 4. The lens 4 has a strong chromatic aberration. Thus, not all wavelengths coming from the fiber 1 are collimated at the same time. Only the collimated bundle of beams is reflected on itself by the mirror 5 and amplified by the fiber laser.

By displacing the collimating lens 4, the wavelength of the beam reflected on itself, and thus the emission wavelength of the fiber laser, may be set. The chromatic aberration of the collimating lens 4 is preferably selected such that only a mild wavelength selection is performed and a sufficiently wide emission is obtained. The lens used has a refractive index of n=1.72, depending on the wavelength, and a focal length f=8 mm.

Figure 2:
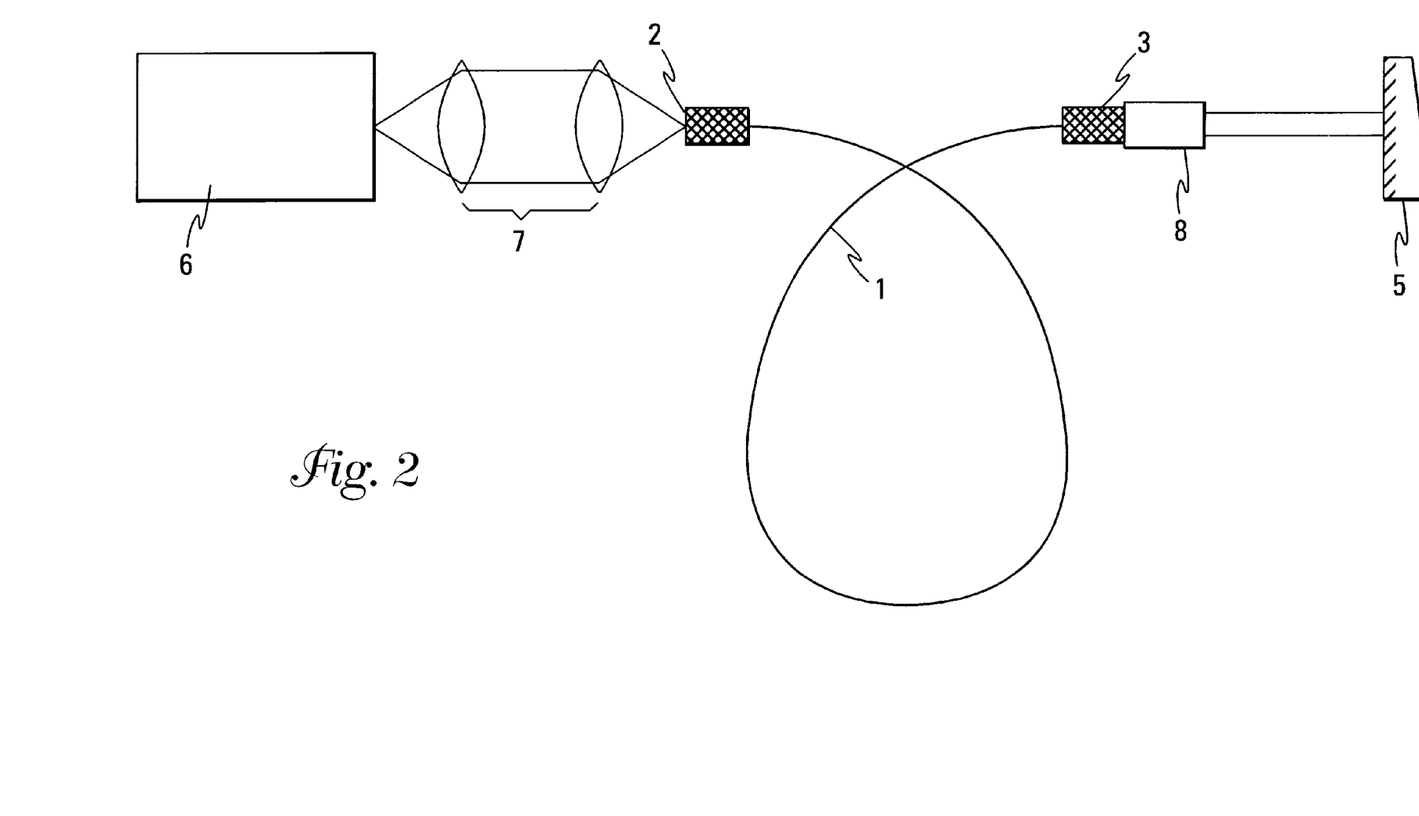
FIG. 2 illustrates a diode laser pumped fiber laser as in FIG. 1, but with a gradient lens as a wavelength-selective element.

FIG. 2 illustrates a fiber laser of the same basic structure as the fiber laser in FIG. 1. As a difference, the collimating lens used is a gradient lens 8. With a gradient lens, the refractive index varies continuously across the radius of the lens and, moreover, depends on the wavelength. Thus, the collimation of the divergent laser beam coming from the fiber 1 and the wavelength selection are achieved. At its end 3, the fiber 1 is cut at right angles to its axis, and the gradient lens 8 that has planar limit surfaces, is set directly onto the non-reflective end 3 of the fiber 1. The fiber end 3 is cut at right angles to the fiber axis. Thus, the laser cannot be tuned, but a disturbing limit surface in the laser resonator can be omitted.

Figure 3:
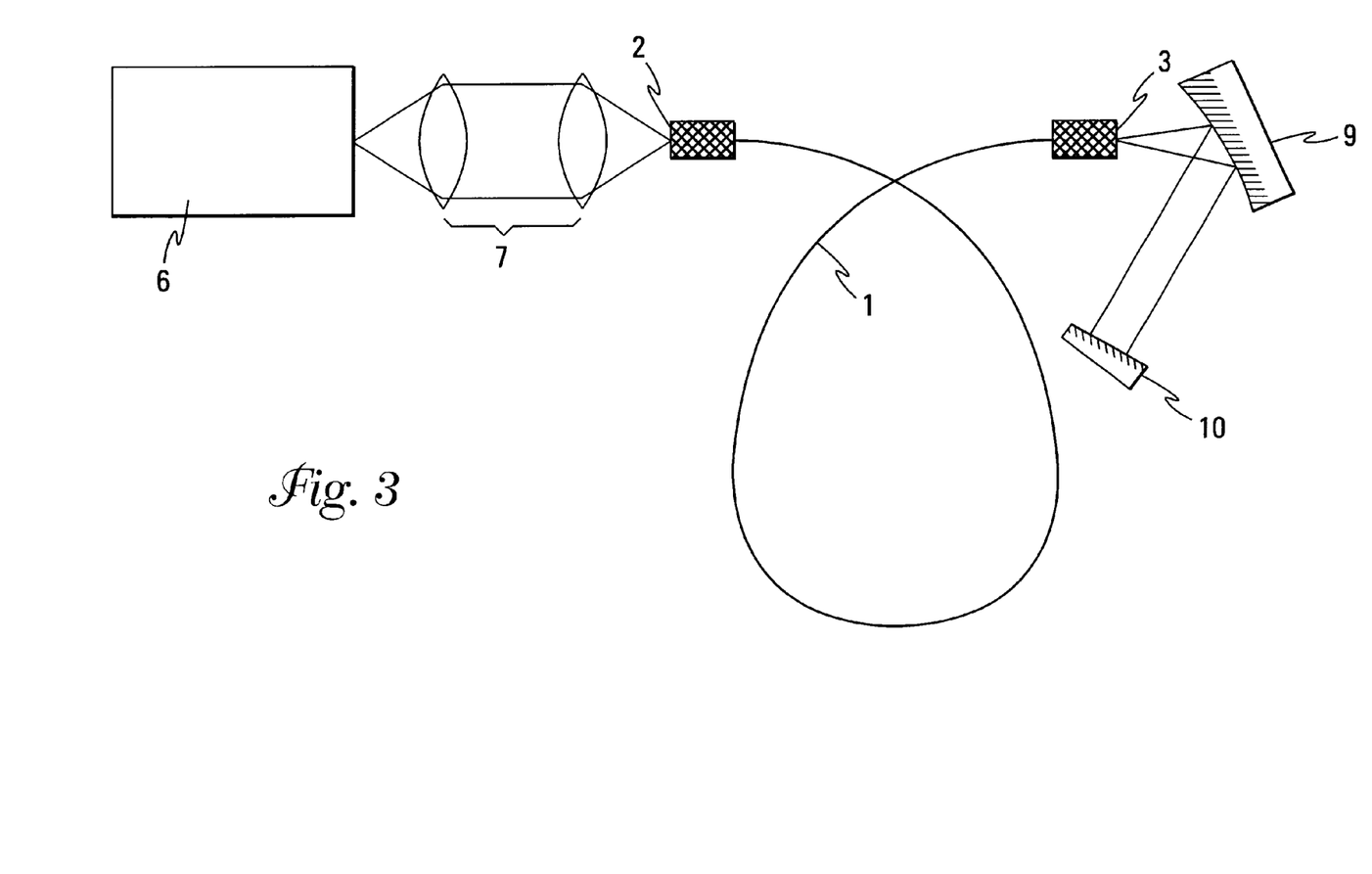
FIG. 3 illustrates a tunable diode laser pumped fiber laser with a parabolic mirror and a graded mirror as the tuning element.

FIG. 3 illustrates a fiber laser, wherein the divergent laser beam from the fiber 1 impinges on a parabolic mirror 9, is collimated and deflected onto a graded mirror 10. With a graded mirror, the wavelength of the maximum of reflection changes in a direction parallel to the surface. The mirror is displaceable in this direction so that the maximum of reflection may be changed during the operation of the laser. Thereby, the emphasis of the laser emission is altered.

Figure 4:
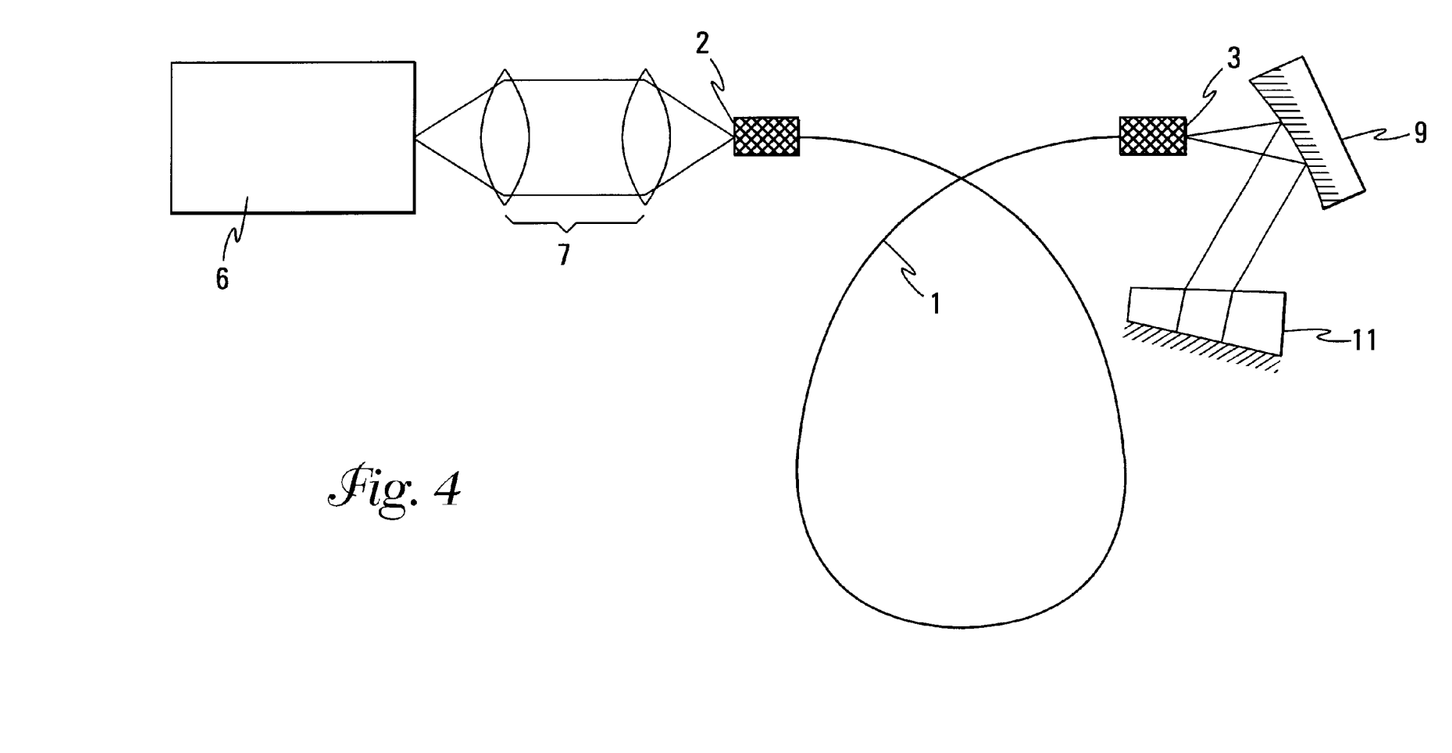
FIG. 4 illustrates a tunable diode laser pumped fiber laser with a parabolic mirror and a prism, reflective on one side, as the tuning element.

The structure represented in FIG. 4 is the same as that of FIG. 3 up to the parabolic mirror 9. They differ in that the former has a prism 11 mirrored on one side for wavelength selection. To make the wavelength selection possible, the prism 11 is rotatably mounted. The mirrored surface acts as an outcoupling mirror. The dispersive properties of the prism 11 cause a different reflection of the beam depending on the wavelength. Only a determined wavelength range will impinge on the mirror in a collimated state, be auto-collimated and amplified by the fiber 1.

Figure 5:
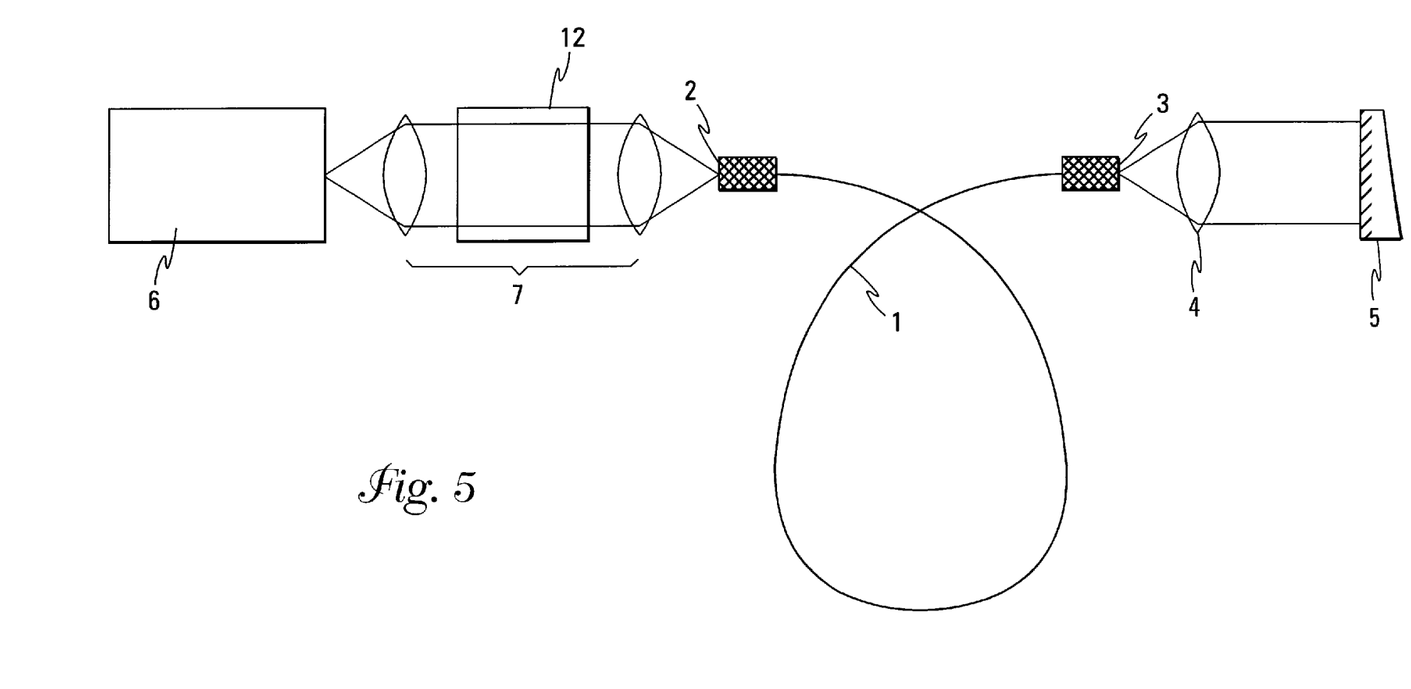
FIG. 5 shows a fiber laser as in FIG. 1, but with an optical diode for decoupling the diode laser and the fiber laser.

FIG. 5 illustrates a structure substantially corresponding to the one of FIG. 1. Yet, the reflective face 2 of the fiber 1 only has a reflectivity of 97% for the emission wavelength, which is why it cannot provide the optical decoupling of the diode laser 6 and the fiber laser. Therefore, an optical diode 12 is added in the beam path of the pumping laser in front of the fiber 1. The optical diode 12 is non-transmissive to the beam reflected towards the fiber laser in the emission wavelength of the fiber laser. The light outcoupled at the reflective side of the fiber falls through the optical diode and is partly reflected by one of the downstream limit surfaces, yet it is not passed towards the fiber laser by the optical diode. Thus, there can be no interaction between the light in the resonator of the fiber laser and the light reflected back from the pump side. Therefore, the emission spectrum is free of resulting interference structures.

Figure 6:
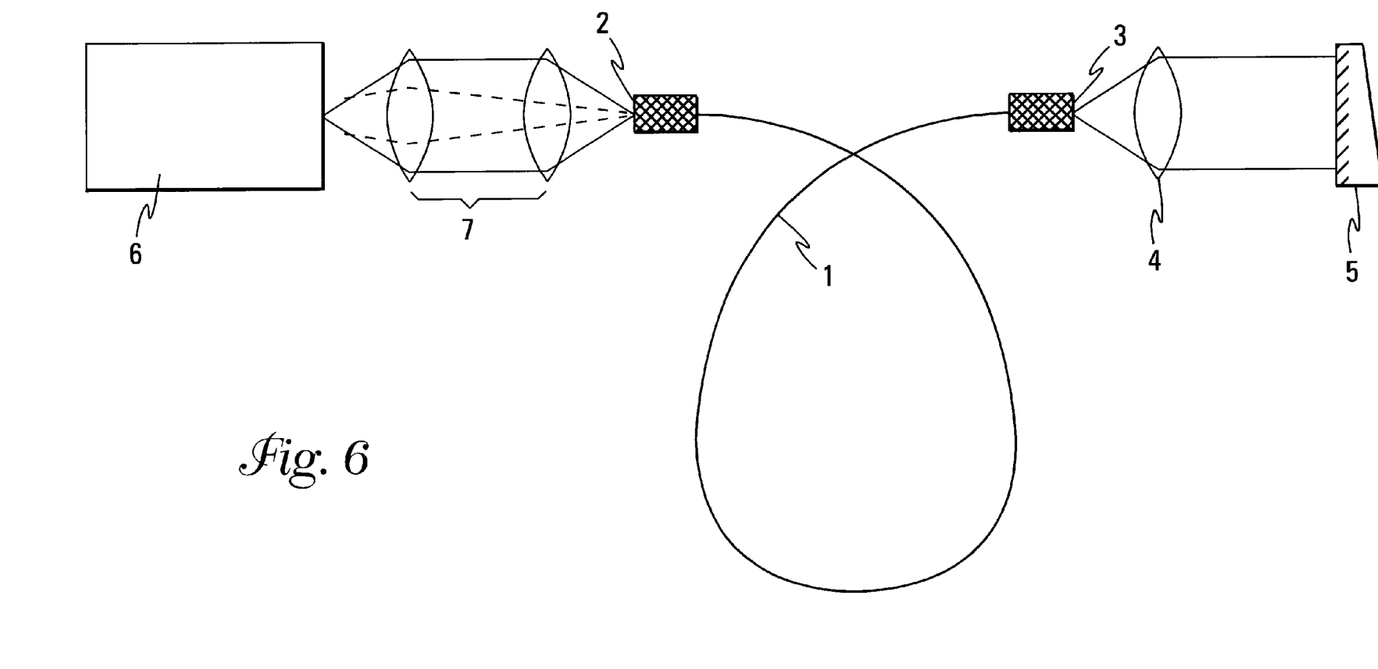
FIG. 6 corresponds to FIG. 5, but with pumping light collimating optics with chromatic aberration for decoupling the diode and fiber lasers.

In the design of FIG. 6, lenses with chromatic aberrations assume the function of the optical diode in the collimating optics 7. Whereas the pumping wavelength in a range of about 820 nm is focused exactly in the fiber, the laser beam, outcoupled on the mirrored side 2 of the fiber and having a wavelength in the infrared range, is not collimated. Consequently, only a minimum portion of the beam is reflected back into the fiber laser. The beam path of the divergent beam from the fiber is shown in dotted lines.

What is claimed is:

1. A diode laser pumped multimode waveguide laser, wherein a cutoff wavelength of the waveguide is smaller than the smallest wavelength of the emission spectrum of the waveguide laser, and wherein the waveguide laser and the diode laser are optically decoupled in the wavelength range of the waveguide laser emission by a reflective end of the waveguide having a reflectivity of at least 99.9% of the emission wavelength.

2. The waveguide laser of claim 1, further comprising collimating optics disposed between the diode laser and the waveguide laser.

3. The waveguide laser of claim 1, further comprising an optical diode provided between the laser diode and the waveguide laser.

4. The waveguide laser of claim 1, further comprising a wavelength-selective element arranged in a resonator area outside of the waveguide.

5. The waveguide laser of claim 1, wherein the duration of pumping pulses of the diode laser is variable.

6. The waveguide laser of claim 1, wherein the waveguide is doped with one of the ions selected from the group of rare earth materials consisting of Nd, Pr, Tm, Ho, Er, and Yb.

7. The waveguide laser of claim 1, wherein the waveguide includes a fiber.

8. The waveguide laser of claim 1 wherein the waveguide is an indiffused waveguide.

9. The waveguide laser of claim 1, wherein the waveguide has a mirrored end reflecting the emitted light and an end not reflecting the emitted light, and the laser resonator is formed by the mirrored end and another mirror.

10. The waveguide laser of claim 4, wherein the wavelength-selective element has optical dispersion.

11. The waveguide laser of claim 4, wherein the wavelength-selective element includes a lens with chromatic aberration.

12. The waveguide laser of claim 4, wherein the wavelength-selective element includes a gradient lens.

13. The waveguide laser of claim 4, wherein the wavelength-selective element comprises an electro-optical modulator.

14. The waveguide laser of claim 4, wherein the wavelength-selective element is a tuning element with a mirror and/or a prism.

15. The waveguide laser of claim 4, wherein the wavelength-selective element is a resonator mirror with a variable maximum of reflection.

16. The waveguide laser of claim 7, wherein the fiber is a glass fiber.

17. The waveguide laser of claim 9, wherein the normal to the surface of the non-reflective end of the waveguide forms an angle with the axis of the waveguide.

18. The waveguide laser of claim 12, wherein the gradient lens is integrally connected with the waveguide.

19. The waveguide laser of claim 13, wherein the electro-optical modulator is integrally connected with the waveguide.

20. The waveguide laser of claim 14, wherein the tuning element is a parabolic mirror deflecting the laser beam in the resonator onto a prism.

21. The waveguide laser of claim 17, wherein the angle is between 1° and 15°.

22. The waveguide laser of claim 20, wherein the prism is reflective on one surface.

23. The waveguide laser of claim 21, wherein the angle is the Brewster angle.

24. A method for performing intra-cavity spectroscopy comprising:
   providing a diode laser pumped multimode waveguide laser, wherein a cutoff wavelength of the waveguide is smaller than the smallest wavelength of the emission spectrum of the waveguide laser, and wherein the waveguide laser and the diode laser are optically decoupled in the wavelength range of the waveguide laser emission by a reflective end of the waveguide having a reflectivity of at least 99.9% of the emission wavelength;
   introducing an end of the waveguide into a cavity, and
   driving the diode laser to perform intra-cavity spectroscopy.

25. A diode laser pumped multimode waveguide laser, wherein a cutoff wavelength of the waveguide is smaller than the smallest wavelength of the emission spectrum of the waveguide laser, and wherein the waveguide laser and the diode laser are optically decoupled in the wavelength range of the waveguide laser emission by a reflective end of the waveguide having a reflectivity of at least 98% of the emission wavelength, and by the waveguide laser including at least one of collimating optics and an optical diode between the diode laser and the waveguide laser.

26. The waveguide laser of claim 25, wherein the waveguide has a reflectivity for the emission wavelength of at least 99%.

27. The waveguide laser of claim 25, wherein the waveguide has a reflectivity for the emission wavelength of at least 99.9%.

* * * * *

UNITED STATES PATENT AND TRADEMARK OFFICE
CERTIFICATE OF CORRECTION

PATENT NO.   : 6,327,278 B1
DATED        : December 4, 2001
INVENTOR(S)  : Peter E. Toschek, Rainer Boehm and Valerie M. Baev It is certified that error appears in the above-identified patent and that said Letters Patent is hereby corrected as shown below:

<u>Title page,</u>
Item [76], delete "Toscheck" and replace with -- Toschek --

Signed and Sealed this

Eighth Day of April, 2003

JAMES E. ROGAN
*Director of the United States Patent and Trademark Office*